United States Patent [19]

Mondt

[11] 3,911,675

[45] Oct. 14, 1975

[54] KEEP-HOT CATALYTIC CONVERTER

[75] Inventor: James R. Mondt, Pontiac, Mich.

[73] Assignee: General Motors Corporation, Detroit, Mich.

[22] Filed: Mar. 25, 1974

[21] Appl. No.: 454,245

[52] U.S. Cl. .................... 60/283; 23/288 F; 60/284; 60/286; 60/300
[51] Int. Cl.² ............................................ F01N 3/14
[58] Field of Search ............. 60/284, 300, 283, 286; 23/288 F

[56] References Cited
UNITED STATES PATENTS

| | | | |
|---|---|---|---|
| 3,059,420 | 10/1962 | Schnabel | 60/283 |
| 3,071,449 | 1/1963 | Shustack | 23/288 F |
| 3,732,696 | 5/1973 | Masaki | 60/286 |
| 3,761,229 | 9/1973 | Schwartz | 60/300 |
| 3,779,015 | 12/1973 | Maruoka | 60/300 |

*Primary Examiner*—Douglas Hart
*Attorney, Agent, or Firm*—K. H. Maclean, Jr.

[57] ABSTRACT

In an automobile having an internal combustion engine whose exhaust is passed through a catalytic converter for decreasing the discharge of products of combustion, a converter heating system to maintain the catalytic converter at a predetermined temperature so that it is effective upon engine start-up to diminish products of combustion. The converter heating system includes in combination a small pump which draws an air-fuel vapor mixture from the fuel tank, an igniter and a pilot burner which is mounted on the converter. Dilution air is mixed with the air-fuel vapor in the pilot burner and ignited by a spark plug-like device which is powered by a vibrator coil system.

2 Claims, 5 Drawing Figures

KEEP-HOT CATALYTIC CONVERTER

This invention relates to a catalytic converter for the exhaust of a motor vehicle and, more specifically, to a heating system adapted to maintain the catalytic converter above a predetermined temperature to provide effective operation of the converter soon after the vehicle is started.

Various catalytic converters have been developed for the exhaust system of an internal combustion engine to reduce the discharge of undesirable unburned hydrocarbons and carbon monoxide. A catalytic converter includes a housing located near an internal combustion engine and connected to the engine's exhaust manifold to receive the hot products of combustion. The housing contains a quantity of catalytic material which, when heated to a predetermined temperature, will thereafter convert combustion products into more desirable discharges.

Most catalysts are effective only above a predetermined high temperature. The internal combustion engine may discharge a considerable amount of hot combustion products subsequent to starting. During this period, a catalytic converter will be below its operational temperature and will normally not significantly convert the combustion products. It is known to provide means to preheat the catalytic converter prior to starting the engine. However, the time lag required to bring the converter up to its operating temperature before starting the engine is a great disadvantage and inconvenience. The present invention provides continuous heating means which maintains the catalytic bed temperature above a predetermined minimum temperature for effective catalytic action.

Specifically, the present invention includes a pilot burner for heating the bed of catalytic material. A mixture of air-fuel from the vehicle fuel tank is mixed with supplemental air prior to being ignited adjacent the bed of catalytic material. Temperature sensors which are connected to an automatic control assembly energize and deenergize the pilot burner so as to maintain the temperature of the catalytic material at a predetermined temperature needed for effective catalytic action. Thus, the converter is continuously ready for engine start-ups and provides effective catalytic conversion of the combustion products soon after the engine is started. The pilot burner is small and, thus, the fuel consumption of the heating system is small. The effect on vehicle mileage caused by burning of the heating fuel in the converter is relatively insignificant.

Therefore, an object of the present invention is to provide an improved catalytic converter for vehicles having an internal combustion engine including a heating system for keeping the catalytic converter above a predetermined temperature by igniting a mixture of air and fuel vapor from the vehicle fuel tank.

A still further object of the present invention is to provide an improved catalytic converter for a vehicle having an internal combustion engine which includes a small pilot burner to which is applied an air-fuel vapor mixture from the fuel tank to maintain the bed of catalytic material above a predetermined temperature necessary for effective converter operation.

Further objects and advantages of the present invention will be more readily apparent from the following detailed description, reference being had to the accompanying drawings in which a preferred embodiment of the invention is clearly illustrated.

IN THE DRAWINGS

Figure 1:
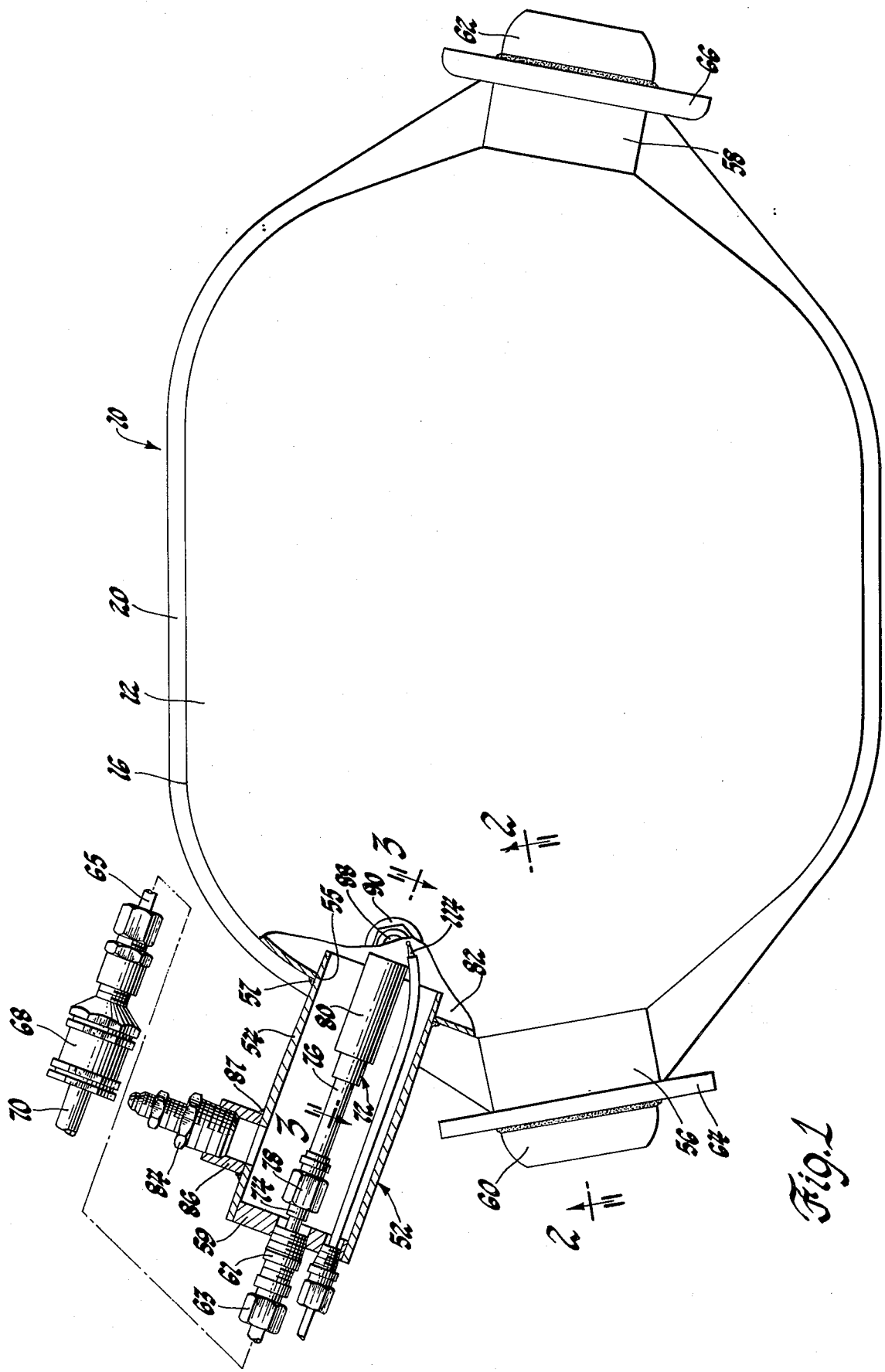
FIG. 1 is a planar view of a catalytic converter and the subject heater partially sectioned to show interior portions.
Figure 2:
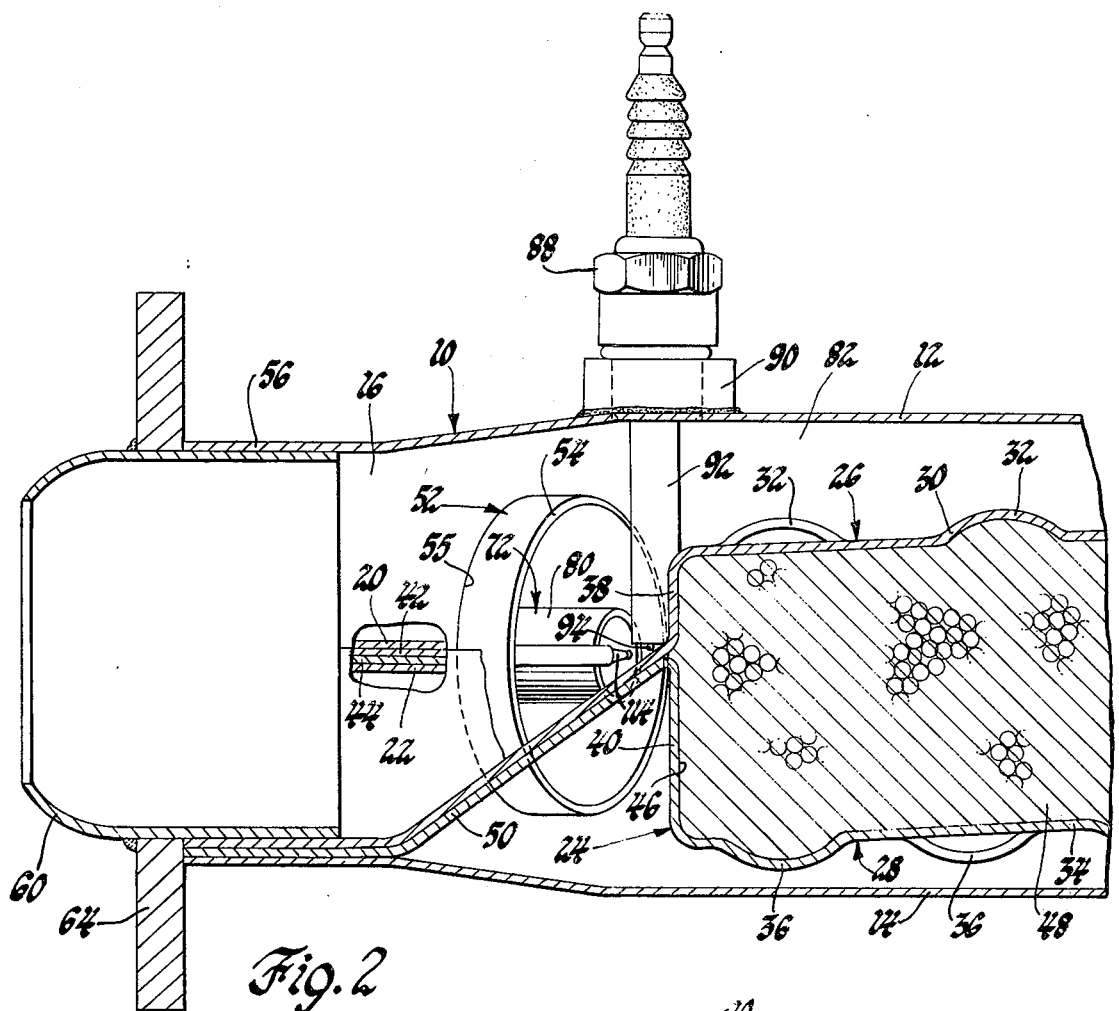
FIG. 2 is an elevational sectioned view of the catalytic converter taken along section line 2—2 in FIG. 1 and looking in the direction of the arrows.
Figure 3:
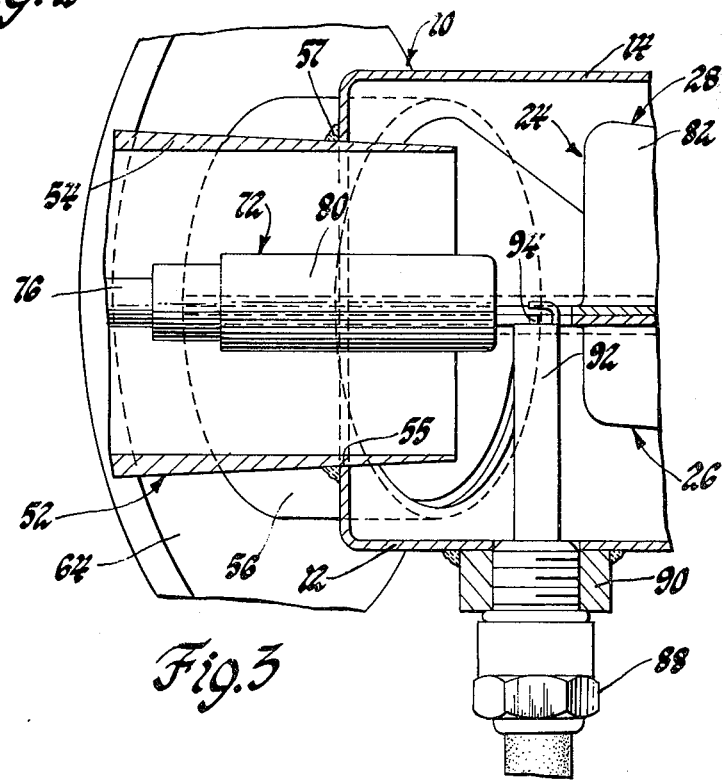
FIG. 3 is an enlarged sectioned view of the subject converter heater taken along section line 3—3 in FIG. 1 and looking in the direction of the arrows.

A catalytic converter is illustrated in FIGS. 1–3 and comprises, generally, a housing 10 formed preferably of a high chromium stainless steel or coated or plated steel effective to resist the corrosive attack of high temperature gases. The converter housing 10 includes a top housing plate or shell 12 and a bottom housing plate or shell 14 and generally vertical extending side wall portions 16 and 18 having peripheral flange portions 20 and 22, respectively, extending therefrom their peripheries in spaced relation to one another.

Mounted within the housing 10 is an inclined catalyst retaining element 24 best shown in FIG. 2. Element 24 comprises a top plate 26 and a bottom plate 28. The top plate 26 includes a louvered top portion 30 spaced from the top housing shell 12 and having a plurality of regularly spaced perforations or louvers 32 therethrough. Similarly, the bottom plate 28 includes a louvered bottom portion 34 spaced from the bottom housing plate or shell 14 and having a plurality of regularly spaced perforations or louvers 36 extending therethrough. The openings 32 and 36 may take several different forms. For example, they may be merely in the form of holes extending through the retaining plates or in the form of projections struck outwardly from the plates as in FIG. 2.

Referring to FIGS. 1 – 3 and to the catalyst-retaining element 24, the plates 26 and 28 include gas-impervious side wall portions 38 and 40, respectively, spaced from the respective side wall portions 16 and 18 of the housing 10. Mating peripheral flange portions 42 and 44 of plates 26, 28 extend therefrom. The catalyst-retaining plates 26 and 28 define an inclined catalyst-retaining space 46 of substantially uniform depth. The space 46 contains a quantity of catalyst material 48, as hereinafter explained, and the catalyst material 48 is tightly packed therein to provide what is termed a catalyst bed.

The catalyst can be used in any form, but is preferably in a pelleted, extruded or spherical form of about ⅛ inch size. Preferably, the catalyst is distributed on or impregnated in a support or carrier which may or may not contribute to the catalytic activity of the composite. The invention is not limited to any particular catalyst but includes the use of any suitable oxidation or reduction catalyst or catalyst capable of both oxidation and reduction which is effective at operating temperatures up to about 1600° F. over extended periods of time. It is desirable that the catalyst bed be relatively shallow to minimize back pressure in the exhaust system. It has been found that a bed of about 2 inches depth performs adequately.

As has heretofore been mentioned, the top and bottom housing plates or shelves 12 and 14, respectively, and the top and bottom catalyst retaining plates 26 and 28, respectively, each have peripheral flange portions 20, 22, 42, 44, respectively, extending outwardly, thus providing the plates with mating peripheral faces over substantially their entire peripheries. The mating peripheral flange portions 42 and 44 of the catalyst element 24 are disposed between the peripheral flange portions 20 and 22 of housing 10 so as to form a four-layer sandwich suitable for edge sealing by means of an external, substantially continuous peripheral weld to provide absolute interior and exterior seal.

In addition to the foregoing, the flange portions of the housing 10 and the element 24 are formed into like-positioned, concave, substantially cylindrical configurations at respective opposite ends of the converter to define a gas inlet 56 and a gas outlet 58 in combination with the housing 10. The inlet 56 and the outlet 58 are adapted to receive and be sealingly joined to members 60 and 62 for attachment to the engine exhaust inlet pipe and the outlet pipe (not shown). Flange members 64 and 66 are attached to the members 60 and 62, respectively, for attachment of a converter to the aforementioned inlet and outlet exhaust pipes.

The bottom retainer member 28 has a portion 50 extending therefrom in the vicinity of inlet 56 to direct the products of combustion upward to the space between member 26 and top shell member 12. Likewise, a similar portion (not visible) in the vicinity of the outlet 58 extends from the top retainer member 26 toward the top shell member 12 to direct the treated exhaust gases from the catalyst bed 48 into the outlet 58. Thus, the members 26 and 28 cause combustion products to flow from inlet 60 to the space between member 26 and top shell 12 and then through the louver openings 32 to the catalyst bed 48. After passing through the catalyst bed 48, the treated combustion products pass through the louvers 36 into the space between member 28 and the bottom shell 14 and therefrom through the outlet 62.

The catalytic reaction which takes place in the catalyst bed 48 is an exothermic reaction, and, therefore, the temperature of the bed and of the treated exhaust gases increase from the heat of the reaction. Temperatures of up to approximately 1600° F. may result. Catalysts typically used in converters do not become effective until the temperature of the catalyst has risen above a predetermined temperature. In the preferred embodiment illustrated, an HN-1290 catalyst is used which is not effective below a temperature of approximately 400°–450° F. As a result, there will be a time delay between starting the engine and the discharge of treated combustion products caused by the time necessary for the hot exhaust gases to heat the catalytic bed. During this period of time, considerable amounts of untreated combustion products will be expelled to atmosphere to contribute to the total emission profile of the engine.

The present invention provides heating means to maintain the catalytic bed at a predetermined operable temperature. This permits immediate catalytic action to treat exhaust gases after the engine is started. Referring specifically to FIGS. 1 – 3, a pilot burner assembly 52 is illustrated which includes a housing 54 which extends through an opening 55 in the catalytic converter housing 10 and is held therein by braze or weld 57. The exterior end of the housing 54 is closed by a cover member 59. Cover member 59 supports a fitting 61 which is connected by fastener 63 and conduit 65 to a flame arrester assembly 68 which may be in the form of a simple check valve to provide for the one-way flow of the air-fuel vapor from the vehicle fuel tank to the pilot burner assembly 52. The flame arrester 68, in turn, is connected by conduit 70 to the top portion of a vehicle fuel tank.

Fitting 61 is also connected to a pilot burner nozzle 72 located within the interior of housing 54. The pilot burner nozzle 72 includes conduits 74 and 76 interconnected by a fitting 78 to direct a fuel-air mixture from the vehicle tank to an enlarged end portion 80 of the pilot burner nozzle. The air-fuel vapor is discharged from the open end of portion 80 into the interior 82 of the converter housing 10 as shown in FIG. 3.

Figure 5:
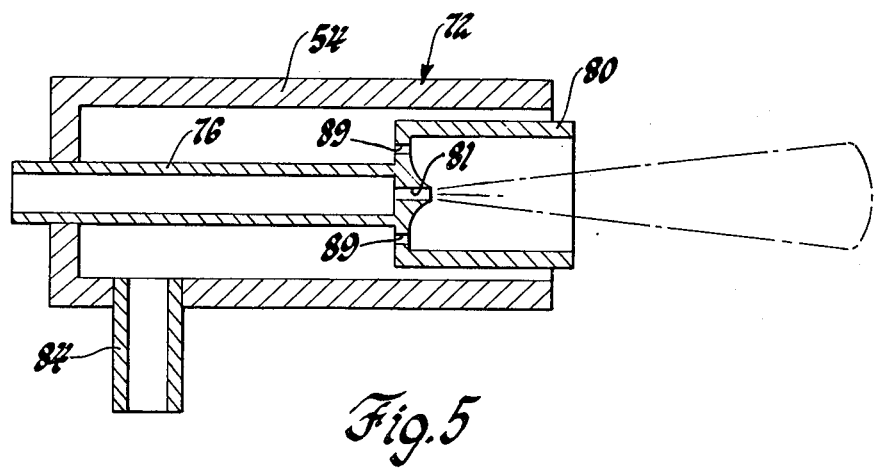
FIG. 5 is a sectional view of the type of pilot burner utilized in the aforementioned system.

A quantity of dilution air is introduced into the housing 54 through a fitting 84 which is threadably supported by member 86 brazed at 87 to the housing 54. The secondary or dilution air flows around the member 80 and is introduced into portion 80 through openings at its base. The pilot burner nozzle assembly 72 is more simply shown in the schematic FIG. 5. The air-fuel ratio from the vehicle fuel tank passes through an orifice 81 as it flows from conduit 76 to the enlarged end portion 80. Secondary air is introduced to the interior of nozzle housing 54 through the inlet fitting 84 and a portion passes between the housing 54 and the enlarged end portion 80 into the interior of the converter. The remainder of the secondary air passes through small orifices 89 into the interior of portion 80 to mix with the air-fuel vapor introduced through orifice 81. This insures that there is an ample supply of air for supporting catalytic activity.

Referring to FIGS. 2 and 3, a spark plug type igniter 88 is illustrated. The spark plug igniter 88 is threadably supported in an extension member 90 of housing portion 12. The spark plug igniter 88 is similar to an ordinary automobile spark plug but has an elongated interior portion in the form of the negative electrode 92 and an inner positive electrode 94. The electrodes provide a spark-producing gap immediately adjacent the open end of the end portion 80 of the pilot burner nozzle 72. The igniter actuator 88 is adapted to be energized by a circuit which is energized only when the vehicle ignition system is in an "Off" position. Thus, the catalytic bed 48 is heated only when the ignition system is deactivated or in an "Off" position. When the ignition system is activated and the engine running, the catalytic bed 48 is heated by the passage of the hot exhaust gases therethrough.

Figure 4:
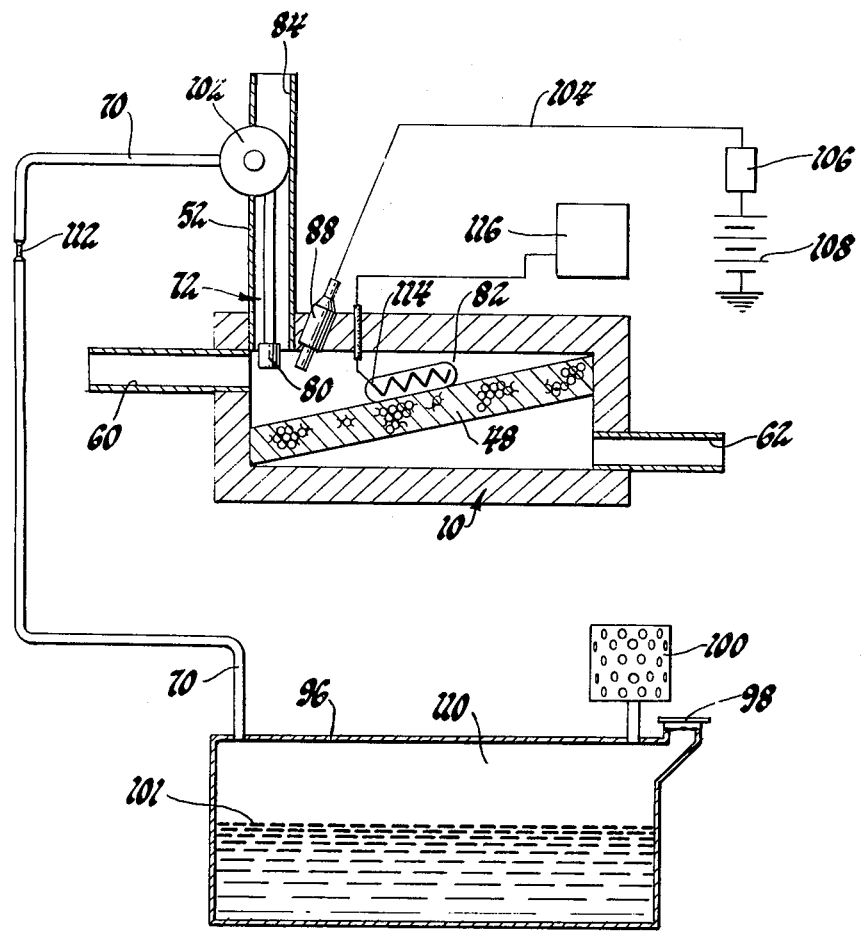
FIG. 4 is a schematic view of the converter heating system.

The subject system is illustrated schematically in FIG. 4. The air-fuel vapor mixture is withdrawn from the top of a vehicle fuel tank 96. The fuel tank 96 is fitted with an inlet 98 normally covered by a cap. The tank may also have a charcoal canister 100 to prevent the escape of hydrocarbons to atmosphere. Conduit 70 is connected to the top portion of the fuel tank 96 to permit the withdrawal of fuel air vapor which collects above the liquid gasoline 101. Normally, the air-to-fuel ratio of the vapor above the liquid gas line is about 4:1 and thus is an extremely rich mixture. This necessitates the addition of dilution air to increase the ratio to a more useful level. A small capacity diaphragm type pump 102 is utilized to draw the fuel-air vapor from the fuel tank 96 and pass it to the assembly 72. Another pump or the opposite side of pump 102 may be used to supply secondary air to the assembly 72.

The igniter 88 is electrically connected by wire 104 to the secondary winding of a vibratory coil 106 whose primary is energized by battery 108.

The aforedescribed system draws the air-fuel vapor from the upper portion 110 of tank 96 through the conduit 70 and through a small orifice 112 used to limit the amount of vapor removed from tank 96. Fuel vapor passes through pump 102 and into the nozzle assembly 72 where it is mixed with secondary air and is discharged into interior space 82 of the converter housing 10. The igniter 88 will ignite the air-fuel mixture to maintain the temperature of the catalytic bed 48 above a predetermined minimum whenever the ignition system is inactive. The temperature of the catalytic bed is monitored by a thermocouple or thermistor 114 which is connected to a temperature control 116. The temperature control 116 energizes the pump 102, the igniter 88 and coil 106 to ignite the air-fuel mixture whenever the ignition system is in an "Off" position and the temperature of the catalytic bed 48 is below a predetermined temperature.

A catalytic converter in accordance with the illustrated embodiment was assembled and tested to determine the effectiveness of the aforedescribed heater system. The catalyst used in the converter was HN-1092 which is a platinum-based catalyst manufactured by Oxy-Catalyst, Inc. In a typical test of the catalytic converter with the subject preheat system, utilizing catalyst HN-1093, an air-fuel vapor of about 4:1 (air to fuel) was supplied to the nozzle 80 at a rate of .43 pounds per hour. A quantity of secondary or dilution air was supplied at a rate of approximately 3.29 pounds per hour to produce a final air-to-fuel ratio of about 60:1. This was sufficient to maintain the center of the catalytic bed above 450° F. The resultant emission of unburned hydrocarbons from the heating system was only 0.8 parts per million. The desirable discharge of carbon dioxide was 3.5%.

To determine the effect of a warmed converter when the engine is first started, a vehicle was run on a cold start driving cycle with a preheated catalyst. The following table illustrates the results from two runs of the tests in regard to the emission of unburned hydrocarbons, carbon monoxide and nitrogen oxide. The vehicle used was a 1970 Chevrolet with a 350 CID, two-barrel carburetor V-8 engine. HN-1290 catalyst was used and the converter housing was covered by ⅝ inch of insulation.

| Run | Converter (Temp.°F) | HC (gram/mile) | CO (gr/mi) | NO$_2$ (gr/mi) |
|-----|---------------------|----------------|------------|-----------------|
| 1 | 600 | .281 | 1.46 | 7.20 |
| 2 | 700 | .696 | 2.39 | 6.02 |

The HC and CO measurements included the pilot burner emission.

Although the embodiment illustrated is a preferred arrangement, other embodiments may be adapted.

What is claimed is as follows:

1. A heated catalytic converter for use in a motor vehicle having an internal combustion engine comprising: a converter housing defining an interior space and having an inlet and an outlet for the flow of exhaust gases from the engine into said interior space and from said interior space to the atmosphere; separation means in said interior space between said inlet and said outlet including a bed of catalytic material supported so as to cause the exhaust gases to pass through said catalytic material; a pilot burner assembly attached to said converter housing having an open discharge end communicated with said interior space upstream from said converter bed; said pilot burner assembly including nozzle means therein fluidly connected to the upper portion of the vehicle fuel tank by a fuel-air line to pass a fuel-air mixture thereto for subsequent flow through said nozzle into said interior space of the converter; said nozzle means including an enlarged open-ended portion communicated with said interior space of the converter and fluidly connected to said fuel-air line by an orifice which controls the flow of the fuel-air mixture entering said interior space and increases its velocity; said pilot burner assembly also including an open-ended nozzle housing encircling said enlarged open-ended portion to define an annular passage therebetween communicated with said interior space for the passage of supplemental air into said interior space; a plurality of small openings in said enlarged open-ended portion encircling said fuel-air orifice, extending from the interior of said nozzle housing to the interiors of said enlarged open-ended portion and said converter for introducing a secondary supply of air to said interior space; the interior of said nozzle housing being fluidly connected to a source of pressurized air for introduction into the interior of said converter through said secondary air openings and said annular passage; pump means including said source of secondary air for passing the fuel-air mixture and the secondary and supplemental air into the interior of said converter through said pilot burner assembly; a spark-producing member for igniting said fuel-air mixture within said interior space upstream from said catalytic bed.

2. A heating system for a catalytic converter for use in a vehicle powered by an internal combustion engine comprising: a pilot burner assembly including a housing attached to the converter housing and having an open end connected to the interior of said catalytic converter upstream from a bed of catalyst material therein; said pilot burner assembly including nozzle means fluidly connected to a fuel-air line extending from the upper portion of the vehicle fuel tank for the passage of a fuel-air mixture into the converter interior; said nozzle having an enlarged open-ended portion communicated with said converter interior and fluidly connected to said fuel-air line by an orifice which regulates the flow of the fuel-air mixture and increases its velocity as it is introduced into said converter interior; said pilot burner assembly also including an open-ended nozzle housing encircling said enlarged open-ended portion to define an annular passage therebetween communicated with the converter interior space for introduction of supplemental air; a plurality of small openings in said open-ended enlarged portion encircling said orifice, extending from the interior of said nozzle housing to the interiors of said enlarged open-ended portion and the catalytic converter for introducing secondary air to combine with said fuel-air mixture; pump means for introducing the fuel-air mixture to said enlarged open-ended portion and secondary and supplemental air to the nozzle housing interior for subsequent discharge into the converter interior through said orifice, small openings and annular passage; a spark-producing member located within the converter interior located upstream from the catalytic bed for igniting the fuel-air mixture and resultantly heating the catalyst bed.

* * * * *